United States Patent
Tamborski et al.

(10) Patent No.: US 11,412,041 B2
(45) Date of Patent: Aug. 9, 2022

(54) AUTOMATIC INTERVENTION OF GLOBAL COORDINATOR

(71) Applicant: International Business Machines Corporation, Armonk, NY (US)

(72) Inventors: Patrick A. Tamborski, Chicago, IL (US); Bart R. Cilfone, Marina del Rey, CA (US); Alan M. Frazier, Palatine, IL (US); Sanjaya Kumar, South Elgin, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 16/017,140

(22) Filed: Jun. 25, 2018

(65) Prior Publication Data
US 2019/0394272 A1 Dec. 26, 2019

(51) Int. Cl.
*H04L 67/1097* (2022.01)
*H04L 67/141* (2022.01)
(Continued)

(52) U.S. Cl.
CPC ...... *H04L 67/1097* (2013.01); *H04L 41/0813* (2013.01); *H04L 41/14* (2013.01); *H04L 67/141* (2013.01); *G06N 20/00* (2019.01)

(58) Field of Classification Search
CPC .... G06F 3/067; G06F 16/248; G06F 11/3034; G06F 11/0727; G06F 11/079;
(Continued)

(56) References Cited

U.S. PATENT DOCUMENTS

| 4,092,732 A | 5/1978 | Ouchi |
| 5,454,101 A | 9/1995 | Mackay et al. |

(Continued)

FOREIGN PATENT DOCUMENTS

| JP | 2003141038 | 5/2003 |
| WO | 2011043883 | 4/2011 |
| WO | 2015159815 | 10/2015 |

OTHER PUBLICATIONS

List of IBM Patents or Applications Treated as Related, Oct. 30, 2018, 2 pages.

(Continued)

*Primary Examiner* — Kevin T Bates
*Assistant Examiner* — Ranjan Pant
(74) *Attorney, Agent, or Firm* — Randy Emilio Tejeda; Andrew D. Wright; Roberts Calderon Safran & Cole, P.C.

(57) ABSTRACT

A computing device includes an interface configured to interface and communicate with a communication system, a memory that stores operational instructions, and processing circuitry operably coupled to the interface and to the memory that is configured to execute the operational instructions to perform various operations. The computing device monitors a current state of a distributed storage and task processing network (DSTN) management unit by periodically collecting metadata that is compared to a previously recognized similar state. The computing device facilitates returning a resolution to the DSTN management unit to modify the current state using corrective actions and the DSTN management unit is configured to automatically execute the resolution or to record the resolution. Recorded resolutions are later passed to operators assigned to the DSN.

20 Claims, 6 Drawing Sheets

(51) Int. Cl.
*H04L 41/0813* (2022.01)
*H04L 41/14* (2022.01)
*G06N 20/00* (2019.01)

(58) Field of Classification Search
CPC .............. G06F 11/3006; G06F 11/321; G06F 11/3476; G06F 3/0619; G06F 3/0653; G06F 11/3051; G06F 11/3495; G06F 3/061; G06F 11/1464; G06F 11/3055; H04L 67/1097; H04L 41/06; H04L 41/16; H04L 41/0813; H04L 41/14; H04L 41/0823; H04L 43/0817; H04L 41/142; H04L 67/141; G06N 20/00
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,163,797 A | 12/2000 | Eckley et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,987,622 B2 | 1/2006 | Nurishi | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,122,114 B1 | 2/2012 | Krishnamoorthy et al. | |
| 8,261,249 B2 | 9/2012 | Archer et al. | |
| 8,386,834 B1 | 2/2013 | Goel et al. | |
| 8,910,022 B2 | 12/2014 | Grube et al. | |
| 9,015,556 B2 | 4/2015 | Leggette et al. | |
| 9,059,939 B2 * | 6/2015 | Garimella | H04L 41/5054 |
| 9,086,994 B2 | 7/2015 | Resch | |
| 9,170,868 B2 | 10/2015 | Dhuse et al. | |
| 9,559,862 B1 | 1/2017 | Dash et al. | |
| 10,205,760 B2 | 2/2019 | Mahmood | |
| 10,606,479 B2 | 3/2020 | Tamborski et al. | |
| 10,810,491 B1 * | 10/2020 | Xia | G06N 3/08 |
| 10,951,485 B1 * | 3/2021 | Hermoni | H04L 41/5051 |
| 11,153,177 B1 * | 10/2021 | Hermoni | H04L 63/1458 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0078985 A1 | 4/2003 | Holbrook et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0086643 A1 | 4/2005 | Shane | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2006/0236198 A1 | 10/2006 | Lintz et al. | |
| 2007/0050417 A1 | 3/2007 | Hasegawa et al. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0234313 A1 | 10/2007 | Teranishi | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2009/0320008 A1 | 12/2009 | Barsness et al. | |
| 2010/0023524 A1 | 1/2010 | Gladwin et al. | |
| 2010/0023593 A1 | 1/2010 | Matsuo | |
| 2010/0169454 A1 * | 7/2010 | Tanimura | H04L 67/62 709/217 |
| 2010/0235585 A1 * | 9/2010 | Dowlatkhah | G06F 16/213 711/136 |
| 2011/0225360 A1 | 9/2011 | Baptist et al. | |
| 2013/0007854 A1 | 1/2013 | Sorenson, III et al. | |
| 2013/0117529 A1 | 5/2013 | Motwani et al. | |
| 2013/0232503 A1 | 9/2013 | Volvovski et al. | |
| 2013/0326264 A1 * | 12/2013 | Resch | G06F 11/1092 714/6.2 |
| 2014/0136901 A1 | 5/2014 | Butler et al. | |
| 2014/0164581 A1 | 6/2014 | Park et al. | |
| 2014/0358995 A1 | 12/2014 | Barc et al. | |
| 2015/0006594 A1 | 1/2015 | Volvovski et al. | |
| 2015/0066875 A1 * | 3/2015 | Peake | G06F 16/27 707/692 |
| 2015/0067819 A1 | 3/2015 | Shribman et al. | |
| 2015/0101024 A1 | 4/2015 | Leggette et al. | |
| 2015/0207880 A1 | 7/2015 | Jin et al. | |
| 2015/0236896 A1 * | 8/2015 | Brown | H04L 43/08 709/201 |
| 2015/0318995 A1 | 11/2015 | Leggette et al. | |
| 2016/0034354 A1 | 2/2016 | Hashimoto et al. | |
| 2016/0080495 A1 | 3/2016 | Bilas et al. | |
| 2016/0224432 A1 | 8/2016 | Junqueira et al. | |
| 2016/0321136 A1 | 11/2016 | Baptist et al. | |
| 2017/0031970 A1 | 2/2017 | Burk et al. | |
| 2017/0090824 A1 | 3/2017 | Tamborski | |
| 2017/0093978 A1 * | 3/2017 | Cilfone | H03M 13/3761 |
| 2017/0131994 A1 | 5/2017 | Middleton et al. | |
| 2017/0192692 A1 | 7/2017 | Baptist et al. | |
| 2017/0249205 A1 | 8/2017 | Iljazi | |
| 2017/0285946 A1 | 10/2017 | Resch et al. | |
| 2017/0286088 A1 | 10/2017 | Litvinsky | |
| 2018/0004449 A1 | 1/2018 | Cilfone et al. | |
| 2018/0018226 A1 | 1/2018 | Kazi | |
| 2018/0018230 A1 | 1/2018 | Leggette | |
| 2018/0062938 A1 * | 3/2018 | Garrison | H04L 41/147 |

(56) References Cited

U.S. PATENT DOCUMENTS

| | | | |
|---|---|---|---|
| 2018/0239683 A1 | 8/2018 | Dankberg et al. | |
| 2018/0284735 A1* | 10/2018 | Cella | G05B 13/028 |
| 2018/0373521 A1 | 12/2018 | Huang et al. | |
| 2019/0250944 A1 | 8/2019 | Pounds et al. | |
| 2020/0050365 A1 | 2/2020 | Tamborski et al. | |
| 2020/0133254 A1* | 4/2020 | Cella | G06N 5/046 |

OTHER PUBLICATIONS

Kreps et al., "a Distributed Messaging System for Log Processing", Jun. 2011, ACM (Year: 2011).
Unger et al., "Agent Based Coordination of Distributed Energy Storage Devices in Future Distribution Grids", 2015, IEEE (Year: 2015) Abstract.
Athas et al., "Multicomputers: Message-Passing Concurrent Computers", Aug. 1988, IEEE (Year: 1988) Abstract.
Sari et al., "Fault Tolerance Mechanisms in Distributed Systems", 2015, Scientific Research Publishing (Year: 2015).
Shamir; How to Share a Secret; Communications of the ACM; vol. 22, No. 11; Nov. 1979; pp. 612-613. Abstract.
Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998. Abstract.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs. Abstract.
Legg; Lightweight Directory Access Protocol {LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol {LDAP): Uniform Resource Locator; IETF Network Working Group; RFC 4516; Jun. 2006; pp. 1-15.
Smith; Lightweight Directory Access Protocol {LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-52.
Sciberras; Lightweight Directory Access Protocol {LDAP): Schema for User Applications; IETF Network Working Group; RFC 4519; Jun. 2006; pp. 1-35.
Harrison; Lightweight Directory Access Protocol (LDAP): Authentication Methods and Security Mechanisms; IETF Network Working Group; RFC 4513; Jun. 2006; pp. 1-34.
Zeilenga; Lightweight Directory Access Protocol (LDAP): Technical Specification Road Map; IETF Network Working Group; RFC 4510; Jun. 2006; pp. 1-7.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000 ); Nov. 2000; pp. 1-12.

* cited by examiner distributed, or dispersed, storage network (DSN) 100

AUTOMATIC INTERVENTION OF GLOBAL COORDINATOR

BACKGROUND

This present application relates to dispersed storage systems, and more specifically, to coordination of responses from dispersed/distributed storage and task processing networks (DSTN) managing units available for use by other applications.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

According to an embodiment of the invention, a computing device (Global Coordinator) monitors a current state of a distributed storage and task processing network (DSTN) management unit by periodically collecting metadata that is then compared by an analytics agent to a previously recognized similar state (knowledge database). The computing device facilitates returning a resolution (corrective actions to modify the current state) to the DSTN management unit. The DSTN management unit is configured either to automatically execute the resolution or to record the resolution. Recorded resolutions are later passed to operators assigned to the DSN.

DETAILED DESCRIPTION

According to an embodiment of the present invention, a dispersed/distributed storage network (DSN) includes multiple distributed computing systems including DSN memories. The DSN memories include distributed storage and task processing network (DSTN) managing units. The DSTN managing units periodically initiate connections with a coordination unit that is part of the DSN and send current state messages to the coordination unit. The coordination unit transmits a coordination message to each DSTN managing unit that initiates an automatic corrective resolution. Each of the DSTN managing units processes the coordination message, in some cases assisting in completion of tasks indicated in the coordination message and returns a response to the coordination unit. The coordination unit makes the responses from the DSTN managing units available for use by other applications.

Figure 1:
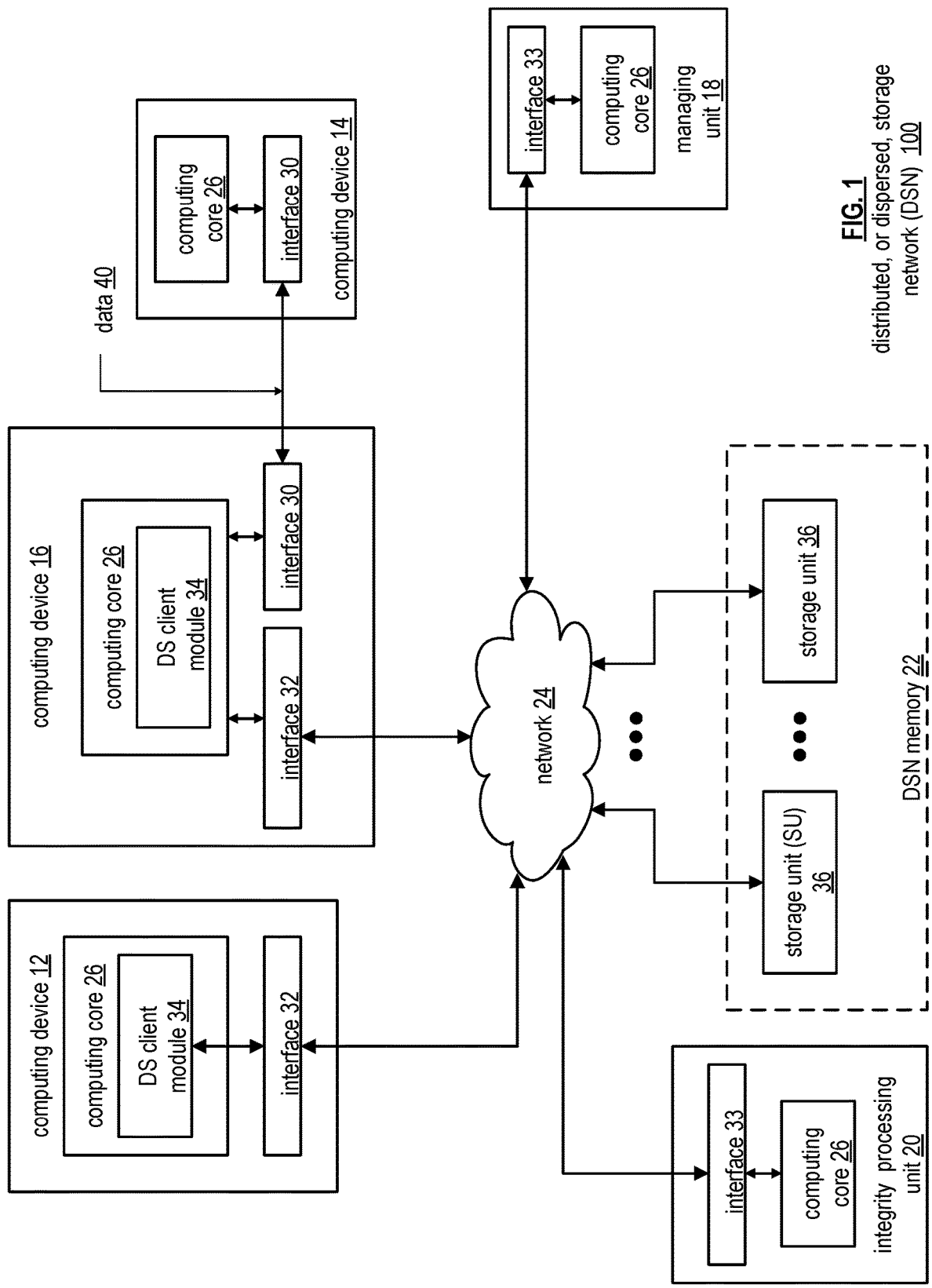
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 100 that includes a plurality of computing devices 12-16, a DSTN managing unit 18 (managing unit), an integrity processing unit 20, and a DSN memory 22. The components of the DSN 100 are coupled to a network 24, which may include one or more wireless and/or wire lined communication systems; one or more non-public intranet systems and/or public internet systems; and/or one or more local area networks (LAN) and/or wide area networks (WAN).

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core or components thereof and a plurality of memory devices for storing dispersed error encoded data.

Each of the computing devices 12-16, the DSTN managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the DSTN managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the DSTN managing unit 18 and the integrity processing unit 20 to the network 24.

Computing devices 12 and 16 include a dispersed storage (DS) client module 34, which enables the computing device to dispersed storage error encode and decode data. In this example embodiment, computing device 16 functions as a dispersed storage processing agent for computing device 14. In this role, computing device 16 dispersed storage error encodes and decodes data on behalf of computing device 14.

With the use of dispersed storage error encoding and decoding, the DSN 100 is tolerant of a significant number of storage unit failures (the number of failures is based on parameters of the dispersed storage error encoding function) without loss of data and without the need for a redundant or backup copies of the data. Further, the DSN 100 stores data for an indefinite period of time without data loss and in a secure manner (e.g., the system is very resistant to unauthorized attempts at accessing the data). When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In an example, the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol. The computing device 12 or 16 then disperse storage error encodes a data segment using the selected encoding function (e.g., Cauchy Reed-Solomon) to produce a set of encoded data slices.

The computing device also creates a slice name (SN) for each encoded data slice (EDS) in the set of encoded data slices. The slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

Figure 2:
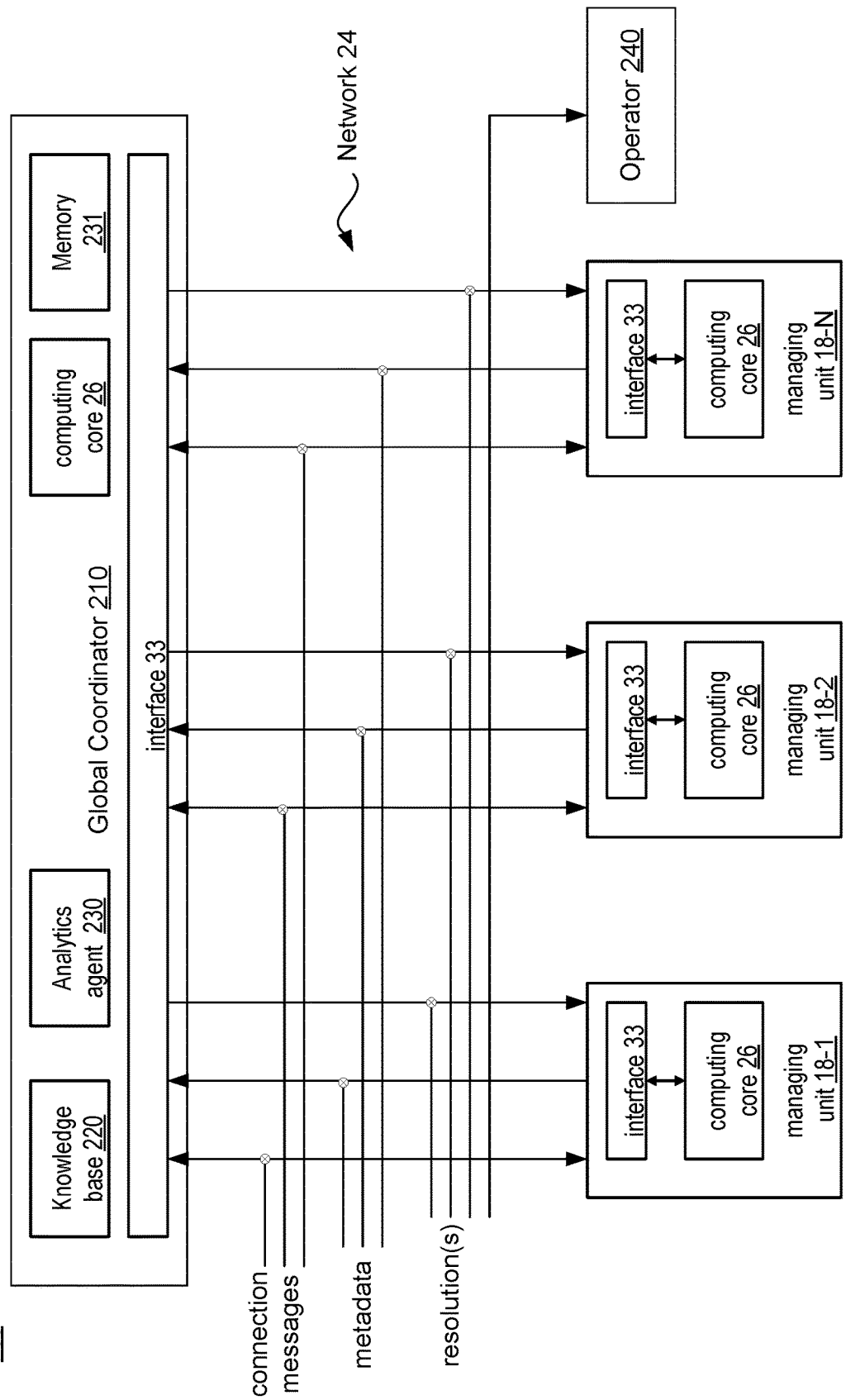
FIG. 2 is a diagram illustrating an embodiment of a Global Coordinator system according to various embodiments of the present invention.

FIG. 2 is a diagram illustrating an embodiment of a global coordinator system 200 according to various embodiments of the present invention. A distributed storage network (DSN) includes multiple distributed computing systems including DSN memories 22. In one embodiment, the DSN memories 22 also include distributed storage and task processing network (DSTN) managing units 18 (1-N) (see detailed operation below). The DSTN managing units initiate periodic connections (communication system—network 24) with a Global Coordinator 210 that is part of the DSN by sending/receiving coordination messages. Global Coordinator 210 (coordination unit) includes a computing device with at least an interface 33, computing core 26, knowledge data base 220, analytics agent (processor) 230 and memory 231. The coordination messages, in addition to creating a communications session, can also include metadata provided by the DSTN managing units 18 (1-N) detailing a present health (recognized states reflecting communication issues, performance issues, full or almost full memories, repairs needed, maintenance needed, outages, outdated systems, etc.).

Analytics agent 230 processes the metadata received by comparing to previously stored metadata to recognize known similar health states and corresponding corrective actions to take to improve the health state. These corrective actions (resolutions) are returned to the DSTN managing units 18 (1-N) to execute (e.g., process corrective actions).

Each of the DSTN managing units processes the coordination messages, in some cases assisting in completion of tasks indicated in the coordination message and return (transmit) a response (e.g., memory status, updates, communication status, performance metrics, etc.) to the Global Coordinator. In one embodiment, the Global Coordinator designates the responses from the DSTN managing units as available for use by other applications.

In operation, the DSTN managing unit 18 performs DS management services. For example, the DSTN managing unit 18 establishes distributed data storage parameters (e.g., vault creation, distributed storage parameters, security parameters, billing information, user profile information, etc.) for computing devices 12-14 individually or as part of a group of user devices. As a specific example, the DSTN managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The DSTN managing unit 18 facilitates storage of DS error encoding parameters for each vault by updating registry information of the DSN 100, where the registry information may be stored in the DSN memory 22, a computing device 12-16, the DSTN managing unit 18, and/or the integrity processing unit 20.

The DSTN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the DSTN managing unit 18 performs network operations, network administration, and/or network maintenance. Network operations include authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 100, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 100. Network maintenance includes facilitating replacing, upgrading, repairing, and/or expanding a device and/or unit of the DSN 100.

Referring again to FIG. 2, in one embodiment, the Global Coordinator 210 performs periodic "near-time" (e.g., every day, every hour, every few minutes, every minute or every partial minute) management duties that one would typically find in a DSTN management unit 18 (1-N). Using the previously described metadata reflecting process health, device health, network health, etc., a view of each DSTN management unit's current state can be created. Support "cases" to provide resolution of various health issues may be automatically generated (by analytics agent 230) if found to be near identical to other previous cases (as stored in a knowledge database 220), and thereafter, automatic resolution steps to modify the state may be applied.

Analytics agent 230, in one embodiment includes artificial intelligence (AI) to discern or uncover specific combinations or patterns reflective of certain issues (e.g., performance, maintenance, etc.). Machine learning techniques known in the art, such as deep learning techniques, are envisioned to populate the knowledge database and/or provide the AI necessary to detect issues reflected by the metadata.

If the DSTN management unit is configured to accept these automatic resolutions, it applies them (executes resolution steps). In this case, operator interaction with the DSTN management unit is not required. Once applied, the DSTN management unit can either apply the resolution locally or distribute it across all affected internal nodes. However, if the DSTN management unit is not configured to accept these automatic resolutions, it leaves them intact and waits for user (operators 240) verification. Alerts can be generated and targeted towards support staff (operators 240) that are assigned to a particular DSN.

In one example configuration, an automatic resolution may be an "on-demand" memory upgrade that is further distributed to individual clusters in the DSN. Note that the information (resolution) sent back to the DSTN could also be a notice that more storage is required. The DSTN management unit could be configured that, when the Global Coordinator determines that storage will reach X % (X is close to 100%) within a short time-frame, then new storage is automatically added (e.g., mapped, purchased, etc.), and the Global Coordinator handles various details like storage requirements, performance requirements, model, number of drives, addressing, access, level of security, etc. This could all be driven through a canned list of configuration options for the Global Coordinator. Alternatively, the Global Coordinator could notify sales personnel to contact a customer under these conditions as well.

Figure 3:
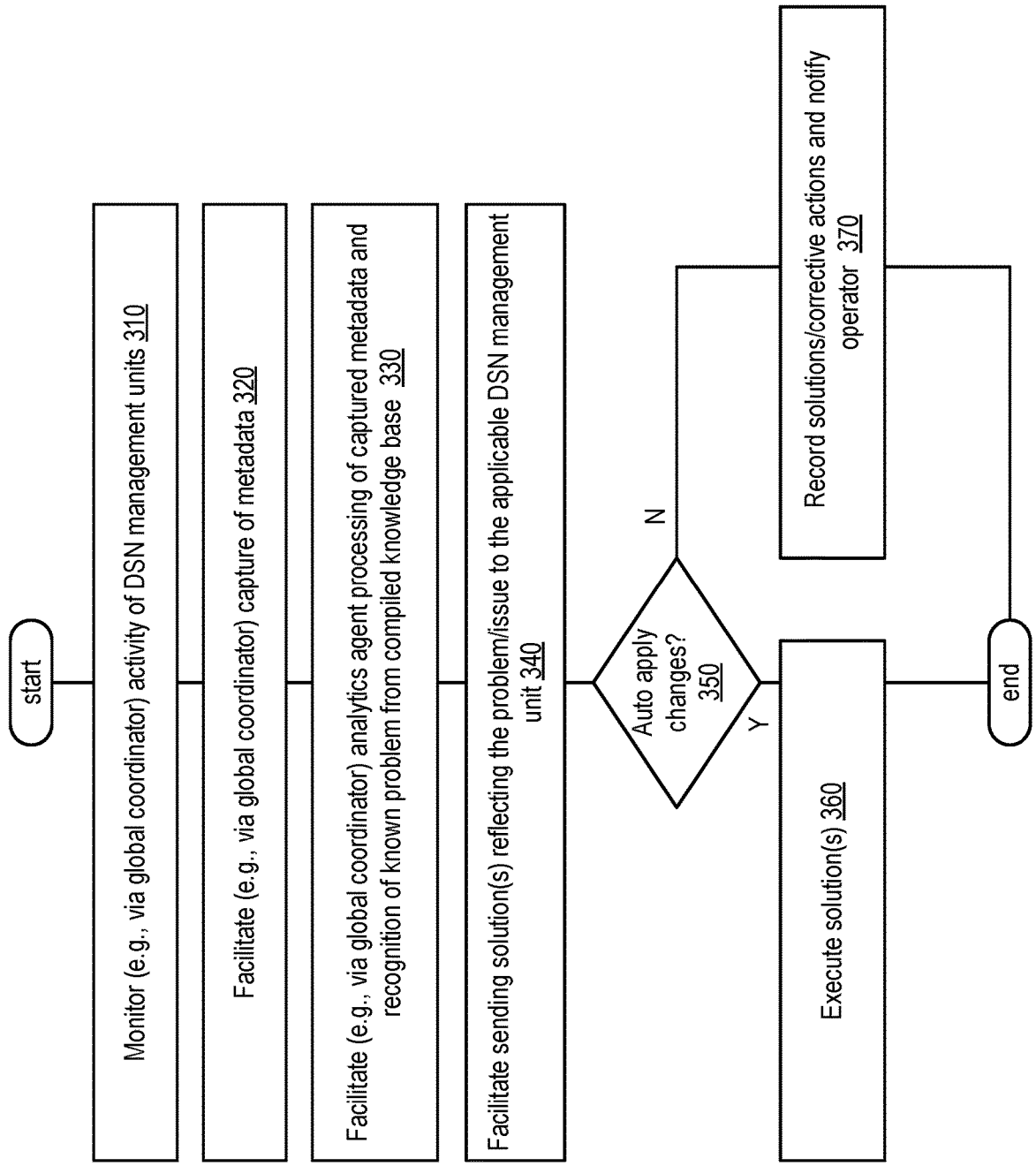
FIG. 3 is a flow diagram illustrating a resolution methodology for execution by one or more computing devices according to various embodiments of the present invention.

FIG. 3 is a flow diagram illustrating a resolution methodology for execution by one or more computing devices according to various embodiments of the present invention. The method 300 operates, in step 310, where monitoring (e.g., via global coordinator) activity of DSN management units 310 is facilitated (through an interface 33) by setting up a coordination session between one or more DSTN management units 18 (1-N) connected to global coordinator 210 to exchange coordination messages.

The method 300 then continues in step 320 by facilitating Global Coordinator capture of metadata reflecting a current state (e.g., process health, device health, network health, etc.) of one or more of the DSTN management unit's 18 (1-N).

The method 300 then continues in step 330 by facilitating a comparison of the captured metadata by analytics agent 230 to previously recognized states (e.g., problems such as communication issues, performance issues, full or almost full memories, repairs, maintenance, outages, outdated systems, etc.) from compiled knowledge database 220. In an alternative embodiment, when no positive comparison is available, the analytics agent may recognize that the reporting DSTN managing unit is potentially not up-to-date and provide a resolution to update one or more components managed by a respective DSTN managing unit 18 (1-N) (including the DSTN unit itself).

Analytics agent 230, in one embodiment includes artificial intelligence (AI) to discern or uncover specific combinations or patterns reflecting certain issues (e.g., performance, maintenance, etc.). Machine learning techniques known in the art, such as deep learning techniques, can be used to populate the knowledge database and/or provide the AI necessary to detect issues reflected by the metadata.

The method 300 then continues in step 340 by facilitating returning a resolution (e.g., solutions to the problem/issue (patch, full upgrade, configuration change)) to the respective DSTN management unit 18 (1-N). The resolutions may be a specific listing of steps to be executed by the Global Coordinator, the respective DSTN managing unit 18 (1-N), an operator or a combination thereof.

The method 300 then continues in step 360, if the management unit is configured to automatically apply the change(s) (350), to execute the resolutions (modify the current state). If not, in step 370 the management unit is configured to record the resolutions (e.g., corrective actions needed), and the operator is made aware that these corrective actions need to take place (e.g., by an alert).

Figure 4:
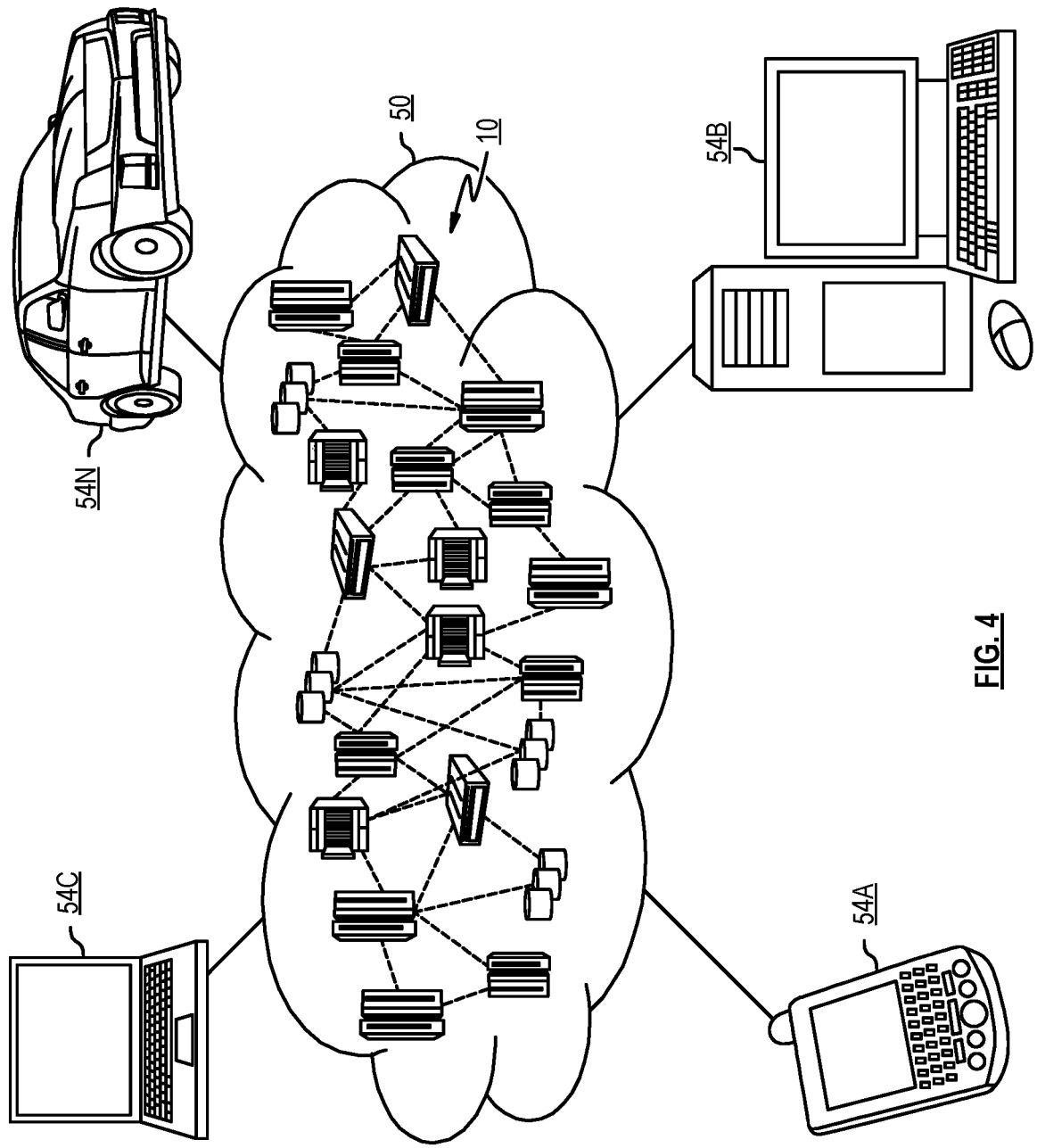
FIG. 4 depicts a cloud computing environment according to various embodiments of the present invention.

FIG. 4 depicts a cloud computing environment 50 according to various embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
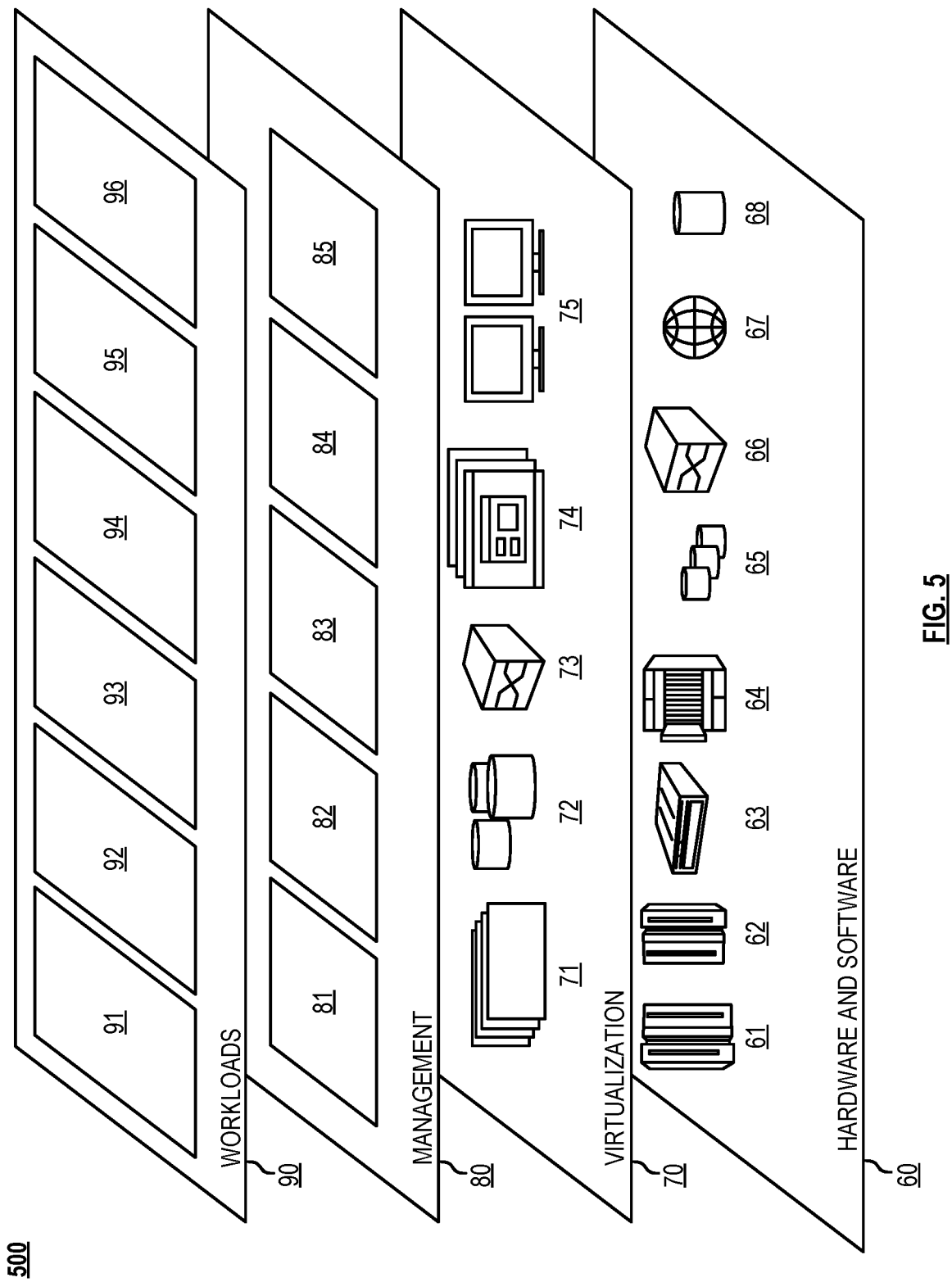
FIG. 5 depicts abstraction model layers according to various embodiments of the present invention.

FIG. 5 depicts abstraction model layers according to various embodiments of the present invention. Referring now to FIG. 5, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. In some embodiments, one or more hardware components can be implemented by utilizing the computing device 701 of FIG. 7.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication system navigation history tracking, processing, and operations 96.

Figure 6:
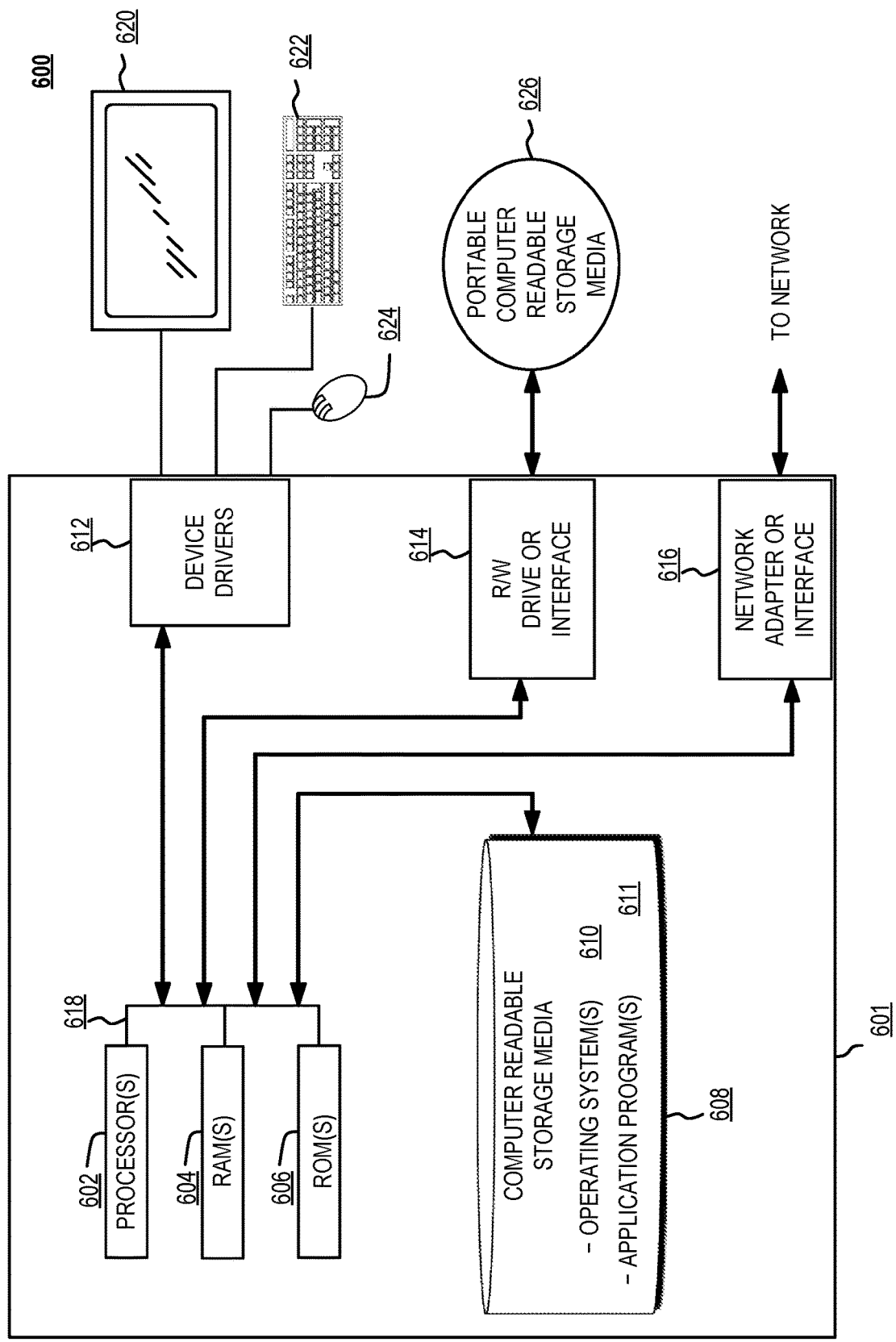
FIG. 6 depicts a block diagram of a computing device according to various embodiments of the present invention.

FIG. 6 depicts a block diagram 600 of a computing device according to various embodiments of the present invention. FIG. 6 depicts a block diagram of components of a computing device 601, which can be utilized to implement some or all of the cloud computing nodes 10, some or all of the computing devices 54A-N of FIG. 4, and/or to implement other computing devices described herein in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 601 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610 and/or application programs 611, such as network application server software 67 and database software 68, are stored on one or more of the computer readable storage media 708 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 601 can also include a R/W drive or interface 614 to read from and write to one or more portable computer readable storage media 626. Application programs 611 on computing devices 601 can be stored on one or more of the portable computer readable storage media 626, read via the respective R/W drive or interface 614 and loaded into the respective computer readable storage media 608.

Computing device 601 can also include a network adapter or interface 616, such as a TCP/IP adapter card or wireless communication adapter. Application programs 611 on computing devices 54A-N can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 601 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device of a distributed storage network (DSN) comprises:
    an interface configured to interface and communicate with a communication system;
    memory that stores operational instructions; and
    processing circuitry operably coupled to the interface and to the memory, wherein the processing circuitry is configured to execute the operational instructions to:
        monitor activity of a distributed storage and task processing network (DSTN) management unit;
        periodically capture metadata reflecting that a current state of the DSTN management unit is that the DSTN management unit is in need of repairs, and wherein the current state reflects communication issues including a communication status;
        compare the current state to a previously recognized similar state of the DSTN management unit reflected in the captured metadata; and
        return a resolution to the DSTN management unit to modify the current state using corrective actions,
    wherein the computing device further includes an analytics agent,
    the analytics agent implements deep learning techniques to provide artificial intelligence to detect issues reflected by the metadata,
    the artificial intelligence analyzes the metadata and, in response to the analyzing, detects that the DSTN management unit is in need of repairs, wherein the metadata reflects at least one of a process health, device health, or network health, and
    the DSTN management unit is configured to automatically execute the resolution.

2. The computing device of claim 1, wherein the computing device is a DSN coordination unit.

3. The computing device of claim 2, wherein the processing circuitry is further configured to execute the operational instructions to:
    set-up a coordination session between one or more of the DSTN management units and the DSN coordination unit to exchange coordination messages.

4. The computing device of claim 1, wherein the computing device is a DSN global coordinator.

5. The computing device of claim 1, wherein the current state reflects one or more of: process health, device health, or network health.

6. The computing device of claim 1, wherein the current state additionally reflects an outage.

7. The computing device of claim 1, wherein the computing device is a DSN global coordinator, and
    the analytics agent implements artificial intelligence (AI) operational instructions to uncover specific combinations or patterns reflecting specific instances of the current state.

8. The computing device of claim 1, wherein the computing device further includes a compiled knowledge database.

9. The computing device of claim 8, wherein the compiled knowledge database is compiled using machine learning techniques to populate the compiled knowledge database.

10. The computing device of claim 8, wherein the compiled knowledge database is compiled using deep learning techniques to populate the compiled knowledge database.

11. The computing device of claim 1, wherein the resolution includes one selected from the group consisting of: a patch, a full upgrade, and a configuration change.

12. The computing device of claim 1, wherein the processing circuitry is further configured to execute the operational instructions to:
    recognize when the DSTN managing unit is an outdated system.

13. The computing device of claim 12, wherein the processing circuitry is further configured to execute the operational instructions to:
    provide a resolution to update one or more components managed by the DSTN managing unit.

14. The computing device of claim 1, wherein the resolution reflects specific listing of steps to be executed by the computing device, the DSTN managing unit, an operator, or a combination thereof.

15. The computing device of claim 1, wherein the communication system includes one selected from the group consisting of; a wireless communication system, a wire lined communication system, a non-public intranet system, a public internet system, a local area network (LAN), a wireless local area network (WLAN), a wide area network (WAN), a satellite communication system, a fiber-optic communication system, and a mobile communication system.

16. The computing device of claim 1, wherein the metadata reflects the current state of the DSTN management unit being a full memory.

17. A method for execution by a computing device, the method comprises:
    monitoring, by a global coordinator, activity of a distributed storage and task processing network (DSTN) management unit through a connected communication session;
    periodically capturing, by the global coordinator, metadata reflecting that a current state of the DSTN management unit is that the DSTN management unit is in need of maintenance, and wherein the current state reflects communication issues including a communication status;

implementing, by an analytics agent, deep learning techniques to provide artificial intelligence to detect issues reflected by the metadata, comparing, by the analytics agent, the current state to a previously recognized similar state of the DSTN management unit reflected in the captured metadata from a knowledge database; and returning, by the global coordinator, a resolution to the DSTN management unit to modify the current state using corrective actions, wherein the artificial intelligence analyzes the metadata and, in response to the analyzing, detects that the DSTN management unit is in need of maintenance, the DSTN management unit is configured to automatically execute the resolution, and the resolution reflects a specific listing of steps to be executed by a combination including both the computing device and the DSTN managing unit.

18. The method of claim 17, wherein the current state additionally reflects repairs needed.

19. A computing device of a distributed storage network (DSN) comprises:

an interface configured to interface and communicate with a communication system;

memory that stores operational instructions;

an analytics agent;

a knowledge database; and processing circuitry operably coupled to the interface, memory, analytics agent and knowledge database, wherein the processing circuitry is configured to execute the operational instructions to:

monitor activity of a distributed storage and task processing network (DSTN) management unit;

periodically capture metadata, through the interface, reflecting that a current state of the DSTN management unit is that the DSTN management unit is in need of repair, and wherein the current state reflects communication issues including a communication status;

implement, by the analytics agent, deep learning techniques to provide artificial intelligence to detect issues reflected by the metadata, compare, by the analytics agent, the current state to a previously recognized similar state of the DSTN management unit reflected in the captured metadata stored within the knowledge database; and return a resolution to the DSTN management unit to modify the current state using corrective actions, wherein the artificial intelligence analyzes the metadata and, in response to the analyzing, detects that the DSTN management unit is in need of repairs, the DSTN management unit is configured to automatically execute the resolution, and the resolution reflects a specific listing of steps to be executed by a combination including all of the computing device, the DSTN managing unit, and an operator.

20. The computing device of claim 19, wherein the processing circuitry is configured to further execute the operational instructions to notify a sales person to contact an operator of the computing device.

* * * * *